(12) United States Patent
Goodman et al.

(10) Patent No.: US 7,551,165 B2
(45) Date of Patent: *Jun. 23, 2009

(54) UPDATABLE ELECTRONIC LABELING OF ELECTRONIC DEVICES

(75) Inventors: Brian Gerard Goodman, Tucson, AZ (US); Michael Philip McIntosh, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 721 days.

This patent is subject to a terminal disclaimer.

(21) Appl. No.: 10/799,461

(22) Filed: Mar. 12, 2004

(65) Prior Publication Data

US 2005/0204124 A1   Sep. 15, 2005

(51) Int. Cl.
    *G06F 3/038*   (2006.01)
(52) U.S. Cl. .................................. 345/204; 700/214
(58) Field of Classification Search ............... 340/5.91, 340/825–825.98; 345/204, 1.1, 50; 235/383, 235/378, 385, 462.46, 487, 492, 493; 709/222; 717/172, 177; 713/100; 369/30.31, 77.2; 360/31, 69, 133, 132, 137, 75; 700/214; 312/9.1–9.64
See application file for complete search history.

(56) References Cited

U.S. PATENT DOCUMENTS

| | | | | |
|---|---|---|---|---|
| 4,962,466 A * | 10/1990 | Revesz et al. | ................. | 705/14 |
| 5,426,581 A * | 6/1995 | Kishi et al. | .................... | 700/64 |
| 5,613,154 A * | 3/1997 | Burke et al. | .................... | 710/1 |
| 5,632,010 A * | 5/1997 | Briechle et al. | .............. | 345/1.1 |
| 6,032,254 A | 2/2000 | Kume | ............................. | 713/2 |
| 6,082,844 A * | 7/2000 | Hausler et al. | ............... | 312/283 |
| 6,089,453 A * | 7/2000 | Kayser et al. | ................ | 235/383 |
| 6,496,945 B2 | 12/2002 | Cepulis et al. | ................ | 714/25 |
| 6,970,318 B2 * | 11/2005 | Goodman et al. | ............. | 360/69 |
| 2002/0073413 A1* | 6/2002 | Goodman | .................... | 717/172 |
| 2003/0125834 A1* | 7/2003 | Campbell et al. | ........... | 700/214 |
| 2003/0177210 A1 | 9/2003 | Stringham | .................. | 709/222 |
| 2003/0217067 A1 | 11/2003 | Gilstrap et al. | .............. | 707/100 |

FOREIGN PATENT DOCUMENTS

| | | |
|---|---|---|
| JP | 3049297 | 3/1991 |
| JP | 6289954 | 10/1994 |
| JP | 2000079254 | 3/2000 |
| JP | 2002016985 | 1/2002 |
| JP | 2002126310 | 5/2002 |

* cited by examiner

*Primary Examiner*—Chanh Nguyen
*Assistant Examiner*—Pegeman Karimi
(74) *Attorney, Agent, or Firm*—John H. Holcombe (57) ABSTRACT

An electronic device employs an electronic persistent visual display. One embodiment comprises a nonvolatile memory for storing information regarding the electronic device; an electronic persistent visual display having an input, the electronic persistent visual display providing a visual label display which persists indefinitely, until updated by an input signal at the input; an operational element, and a processor for operating the operational element. One type of electronic persistent visual display has a stable image "memory effect" for an extended period of time in the absence of power, and another type is powered by a power source. The processor, in response to a predetermined state, such as a power-on, provides an update input signal at the electronic persistent visual display input. The update input signal comprises information selected from the stored information regarding the electronic device, for updating the visual label display of the electronic persistent visual display.

11 Claims, 9 Drawing Sheets

UPDATABLE ELECTRONIC LABELING OF ELECTRONIC DEVICES

DOCUMENT INCORPORATED BY REFERENCE

Commonly assigned U.S. patent application Ser. No. 10/649,095, filed Aug. 26, 2003, is incorporated for its showing of an electronically updatable labeling system for data storage.

FIELD OF THE INVENTION

Electronic devices, such as tape drives, disk drives, controllers, node cards, processor boards, electronic assemblies, etc., have semi-static information associated with them, such as part numbers, serial numbers, engineering change levels, computer readable program code or firmware levels, etc. Electronic devices are formed of a processor and at least one operational element, and the software or firmware of the processor, or the hardware comprising the operational element, or software or firmware of the operational element is subject to change. This information is commonly stored by the processor of the device or in a nonvolatile memory, accessed by the processor, so that it can be queried by an operator or by a system of which the electronic device is a component. Additionally, the information is provided in the form of printed or written labels so that the information is visible, since the information is commonly needed when the device is defective, powered off or disassembled. A problem with printed labeling is keeping the labels in synchronism with the actual hardware or software. For example, hardware or software may be upgraded but the label may not be replaced. The logistics of labeling may also be difficult, in that labels may be manually placed, and thereby subject to error. Further, labels cannot typically be run through a "wet" process, so the labels cannot be placed until after assembly is nearly complete.

Preprinted labels may be employed, but the information may be limited in scope, for example, providing a device serial number, but not relating to the current state of the hardware or software engineering change or version level. Labels may be updated by applying a new label to the device, for example, by physically applying it over the top of a prior label. Having the appropriate label and installing the label, especially in the field, may be difficult. Alternatively, the installer of a change or update to the hardware or software may write the new level on the existing label. The handwritten information is difficult to read and may disappear or wear off over time.

SUMMARY OF THE INVENTION

An electronic device, a computer program product, and a system are provided employing an electronic persistent visual display. There are two types of electronic persistent visual displays, one having a stable image "memory effect" for an extended period of time in the absence of power, and the other is powered by a power source.

In one embodiment, an electronic device comprises a nonvolatile memory for storing information regarding the electronic device; an electronic persistent visual display having an input, the electronic persistent visual display providing a visual label display which persists indefinitely, until updated by an input signal at the input; at least one operational element; and a processor. The processor operates the at least one operational element; and, the processor, in response to a predetermined state, provides an update input signal at the electronic persistent visual display input. The update input signal comprises information selected from the information regarding the electronic device stored in the nonvolatile memory, the update signal for updating the visual label display of the electronic persistent visual display. Herein, "updating" comprises refreshing the visual label display with existing information, or providing new or updated information, or a combination. Thus, the use of preprinted or handwritten labels is avoided.

In one embodiment, the predetermined state of the processor comprises a power-on or reset of the processor.

In a further embodiment, the predetermined state of the processor comprises an expiration of a predetermined interval of time.

In another embodiment, the processor additionally updates the information regarding the electronic device stored in the nonvolatile memory, and the information selected by the processor comprises at least the updated information regarding the electronic device.

In a further embodiment, wherein the processor comprises a programmable computer processor, the predetermined state of the processor comprises completion of an update to computer readable program code of the programmable computer processor. In another embodiment, the processor additionally updates the information regarding the electronic device stored in the nonvolatile memory with a version number of the update to the computer readable program code of the programmable computer processor, and the information selected by the processor for the processor update signal comprises at least the status information.

In still another embodiment, the processor comprises programmable logic and the predetermined state of the processor comprises completion of an update to the programmable logic. In a further embodiment, the processor additionally updates the information regarding the electronic device stored in the nonvolatile memory with status information, such as a version number of the update to the programmable logic, and the information selected by the processor for the processor update signal comprises at least the Status in formation.

In a still further embodiment, the predetermined state of the processor comprises a state achieved in response to an indication of completion of an engineering change to the electronic device. In another embodiment, the processor additionally updates the information regarding the electronic device stored in the nonvolatile memory with status information, such as an engineering change number of the engineering change to the electronic device, and the information selected by the processor for the processor update signal comprises at least the status information.

In another embodiment, the predetermined state of the processor comprises a state achieved in response to an indication of a change to the at least one operational element. In a further embodiment, the processor additionally updates the information regarding the electronic device stored in the nonvolatile memory with status information, such as an identifier related to the change to the at least one operational element, and the information selected by the processor for the processor update signal comprises at least the status information.

In a further embodiment, the electronic device additionally comprises an input/output interface; and the predetermined state of the processor comprises a state achieved in response to a signal received at the input/output interface. In a still further embodiment, the processor additionally selects the information stored in the nonvolatile memory in accordance with the signal received at the input/output interface.

In still another embodiment, an electronic device comprises an electronic persistent visual display mounted at the device, the electronic persistent visual display having an input, the electronic persistent visual display providing a visual label display which persists indefinitely, until updated by an input signal at the input; at least one operational element; and a processor for operating the at least one operational element. The processor stores information regarding the electronic device; and the processor, in response to a predetermined state, provides an update input signal at the electronic persistent visual display input. The update input signal comprises information selected from the information regarding the electronic device stored by the processor, the update signal to update the visual label display of the electronic persistent visual display.

In a still further embodiment, a computer program product is provided which is usable with a processor of an electronic device, the computer program product having computer readable program code embodied therein for operating at least one operational element and an electronic persistent visual display having an input. The electronic persistent visual display provides a visual label display which persists indefinitely, until updated by an input signal at the input. The computer readable program code comprises computer readable program code causing the processor to store information regarding the electronic device; and computer readable program code causing the processor to, in response to a predetermined state, provide an update input signal at the electronic persistent visual display input, the update input signal comprising information selected from the information regarding the electronic device stored by the processor, the update signal to update the visual label display of the electronic persistent visual display.

In another embodiment, a system is provided comprising a network; and a plurality of components. At least one of the components comprises a network interface to the network; an electronic persistent visual display mounted at the component, the electronic persistent visual display having an input, the electronic persistent visual display providing a visual label display which persists indefinitely, until updated by an input signal at the input; at least one operational element; and a processor for operating the at least one operational element. The processor stores information regarding the component; and the processor, in response to a predetermined state, provides an update input signal at the electronic persistent visual display input, the update input signal comprising information selected from the information regarding the electronic device stored by the processor, the update signal to update the visual label display of the electronic persistent visual display.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
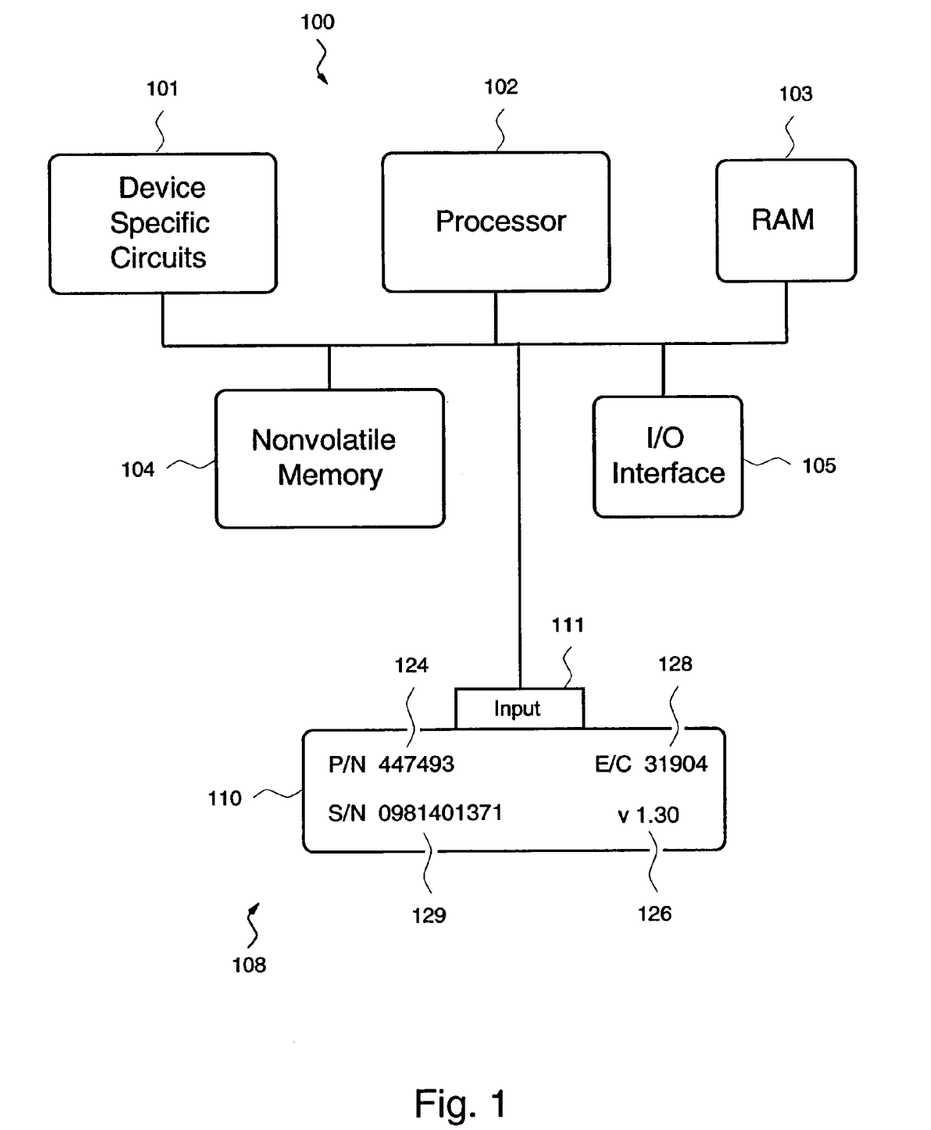
FIG. 1 is a block diagrammatic illustration of an embodiment of an electronic device having an electronic persistent visual display providing a visual label display in accordance with the present invention.

Referring to FIG. 1, an example of an electronic device 100 is illustrated, such as an electronic device which implements specialized functions or service. Examples of electronic devices are disk drives, tape drives, controllers, node cards, processor boards, electronic assemblies, modems, answering machines, medical drug infusion systems, and storage automation products to control accessors or provide communications. The electronic device is illustrated with a computer processor 102, optional RAM (Random Access Memory) 103, a rewritable nonvolatile memory 104, device specific circuits 101 and an I/O interface 105, any or all of which may comprise "elements" of the electronic device 100. Herein, the device specific circuits 101 comprise the operational element of the electronic device 100. The computer processor 102 may be an off-the-shelf microprocessor, custom processor, programmable logic, discrete logic, etc., as are known to those of skill in the art. The rewritable nonvolatile memory 104 may hold the executable computer readable program code of a computer program product, or the logic of a programmable logic device, which may also be called firmware, and any nonvolatile data for the computer processor 102, and may comprise a PROM (Programmable Read-Only Memory), flash PROM, battery backup RAM, and other of many types of nonvolatile memory are also known to those of skill in the art. The processor 102 may alternatively maintain the executable computer readable program code in an internal memory. The rewritable nonvolatile memory 104 may also hold programmable firmware for a programmable logic processor 102.

An input/output interface 105 may be provided, and is some form of communication interface that allows the computer processor 102 to communicate with the outside world. Examples may include SCSI (Small Computer Systems Interface), Ethernet, Fibre Channel interfaces, CAN (Controller Area Network), RS-232 (Recommended Standard), etc. Alternatively or additionally, the input/output interface may comprise an access port at which an authorized person or apparatus may connect to the electronic device.

The device specific circuits 101 provide additional hardware to enable an electronic device 100 to perform specific functions such as motor control of an accessor for an automated data storage library, operate a magnetic tape drive, etc. The device specific circuits 101 may comprise electronics that provide Pulse Width Modulation (PWM) control, Analog to Digital Conversion (ADC), Digital to Analog Conversion (DAC), Liquid Crystal Display (LCD) controller, etc.

Any of the elements of FIG. 1 may be combined into one or more components, for example, the nonvolatile memory 104, RAM 103, and/or I/O interface 105 may comprise components of the processor 102.

Upgrades to the computer readable program code may not require any change or addition to the hardware to implement, resulting in a new version of the code, and may be provided by transfer to the electronic device 100, e.g., through the I/O interface 105. Upgrades to computer readable program code of a computer program product may be stored in nonvolatile memory 104, or the memory may comprise a part of or be separate from, the computer processor, and may comprise one or a plurality of memories. Changes to the hardware, or a combination of software or firmware and hardware, may comprise an engineering change to the electronic device 100. If a major element of the hardware, and/or its operating software or firmware, is altered or changed, the electronic device may be given a new part number and/or serial number, and if the processor 102 or its software or hardware is altered or changed, the processor may be given a new serial number.

Thus, as discussed above, electronic devices 100 have information associated with them, such as part numbers, serial numbers, engineering change levels, computer readable program code or firmware levels, etc., that is subject to change. This information is commonly stored by the processor 102 of the device or in the nonvolatile memory 104, such that it may be accessed by the processor, so that it can be queried by an operator or by a system of which the electronic device is a component. Additionally, the information is provided in the form of printed or written labels so that the information is visible since the information is commonly needed when the device is powered off or disassembled. A PROM chip may not be rewritable and must be replaced in a socket, and a label may have to be placed on the board having the socket.

In accordance with the present invention, the electronic device 100 is provided with an electronic persistent visual display 108 mounted at the device. The electronic persistent visual display has an input 111, the electronic persistent visual display providing a visual label display 110 which persists indefinitely, until updated by an input signal at the input.

The persistent visual display is defined as providing a visual label display which persists indefinitely, even if any input signal is removed. Thus, an input signal may update the display, and the updated display will persist after the input signal is removed.

Still referring to FIG. 1, an electronic persistent visual display 108 has a stable image "memory effect" for an extended period of time. An example of a first type of electronic persistent visual display which has a persistent display in the absence of power is an "E Ink" electronic display which is available from E Ink Corporation, 733 Concord Ave., Cambridge, Mass. 02138.

Figure 2:
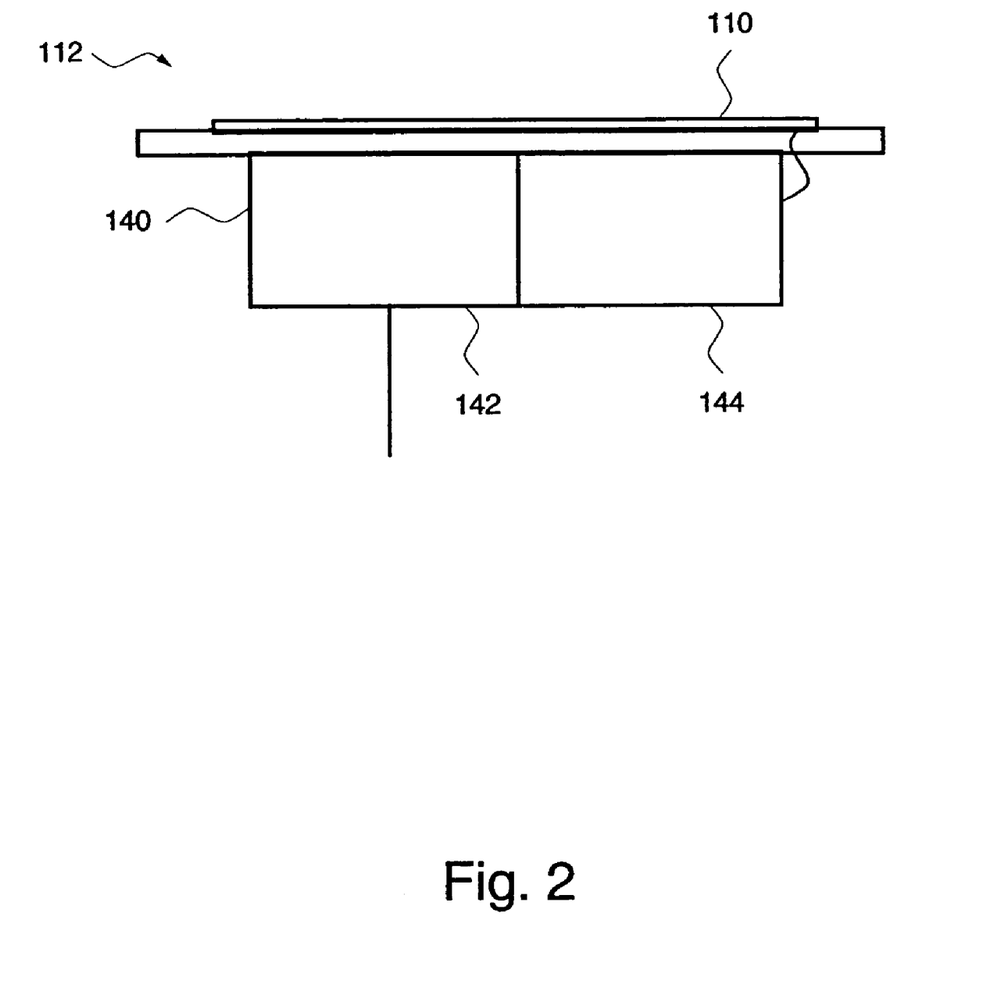
FIG. 2 is a block diagrammatic representation of an alternative embodiment of an electronic persistent visual display providing a visual label display in accordance with the present invention.

Alternatively, referring to FIG. 2, a second type of electronic persistent visual display 112 that requires power for persistent display, may be used. Examples of displays comprise LCD (liquid crystal display), LED (light emitting diode) display, or equivalent, as understood by those of skill in the art. Examples of power sources for persistent displays comprise a battery or a capacitor, etc., charged via electrical connection, induction, light, RF energy, etc., as is understood by those of skill in the art. The electronic persistent visual display comprises at least one electronic module 140 for operating the electronic persistent visual display 112. The electronic module comprises an input 142 for providing a signal for updating the visual label display 110 of the electronic persistent visual display, and, for the second type of display, a power element 144 is provided to update and maintain the persistent display.

Referring to FIGS. 1 and 2, the processor 102 operates the at least one operational element 101, and, the processor, in response to a predetermined state, provides an update input signal at the electronic persistent visual display input 111 of FIG. 1, or the electronic persistent visual display input 142 of FIG. 2. The update input signal comprises information selected from the information regarding the electronic device stored in the nonvolatile memory 104, and/or stored by the processor 102. The update signal updates the visual label display 110 of the electronic persistent visual display 108, 112. Thus, the use of preprinted or handwritten paper or plastic labels is avoided.

Still referring to FIGS. 1 and 2, in one embodiment, the update may comprise exactly the same information as previously held by the electronic persistent visual display 108, 112, and comprise a "refresh" of that information, for example, if the predetermined state of the processor 102 comprises a power-on or reset of the processor or some other trigger, such as an expiration of a predetermined interval of time.

Alternatively, the update may comprise all or some new information selected from the information regarding the electronic device stored in the nonvolatile memory 104, and/or stored by the processor 102.

In one example, the processor 102 updates the information regarding the electronic device 100 stored in the nonvolatile memory and/or stored by the processor, and the information selected by the processor comprises at least the updated information regarding the electronic device. Examples comprise status information, such as engineering changes, software or firmware updates, etc.

Referring to FIG. 1, changes to the hardware, or a combination of software or firmware and hardware, may comprise an engineering change to the electronic device 100. If a major element of the hardware, and/or its operating software or firmware, is altered or changed, the electronic device may be given a new part number and/or serial number, and if the processor 102 or its software or hardware is altered or changed, the processor may be given a new serial number. Thus, as discussed above, electronic devices 100 have information associated with them, such as part numbers, serial numbers, engineering change levels, computer readable program code or firmware levels, etc., that is subject to change. For example, the visual label display 110 of the electronic persistent visual display may comprise a part number 124, a software or firmware version level 126, an engineering change level 128, and a serial number 129.

Referring to FIGS. 1 and 2, in a further example, the processor 102 comprises a programmable computer processor, and the predetermined state of the processor comprises completion of an update to computer readable program code of the programmable computer processor. In one example, the processor updates the information regarding the electronic device stored in the nonvolatile memory and/or stored by the processor with status information, such as a version number or level of the update to the computer readable program code of the programmable computer processor, and the information selected by the processor for the processor update signal comprises at least the version number or level 126 of the update to the computer readable program code for display by the visual label display 110.

In still another example, the processor 102 comprises programmable logic and the predetermined state of the processor comprises completion of an update to the programmable logic. In one example, the processor updates the information regarding the electronic device stored in the nonvolatile memory and/or stored by the processor with a version number of the update to the programmable logic, or a change to the part number, and the information selected by the processor for the processor update signal comprises at least the status information, for example, comprising the version number or level 126 of the update to the programmable logic for display by the visual label display 110.

In a still further example, the predetermined state of the processor 102 comprises a state achieved in response to an indication of completion of an engineering change to the electronic device 100, as discussed above. In one example, the processor updates the information regarding the electronic device stored in the nonvolatile memory and/or stored by the processor with status information, such as an engineering change number of the engineering change to the electronic device, and the information selected by the processor for the processor update signal comprises at least the status information, for example, comprising the engineering change number or level 128 of the engineering change for display by the visual label display 110.

In another example, the predetermined state of the processor 102 comprises a state achieved in response to an indication of a change to the at least one operational element 101. In one example, the processor updates the information regarding the electronic device stored in the nonvolatile memory and/or stored by the processor with status information, such as an identifier related to the change to the at least one operational element, and the information selected by the processor for the processor update signal comprises at least the status information, such as the identifier related to the change to the at least one operational element, which may comprise a engineering change level 128 or a new part number 124, or a new serial number 129, or another identifier, for display by the visual label display 110.

In a further example, the electronic device 100 comprises an input/output interface 105, as discussed above, and the predetermined state of the processor 102 comprises a state achieved in response to a signal received at the input/output interface. In one example, the processor 102 elects the information stored in the nonvolatile memory 104 and/or stored by the processor in accordance with the signal received at the input/output interface for display by the visual label display 110.

Figure 3:
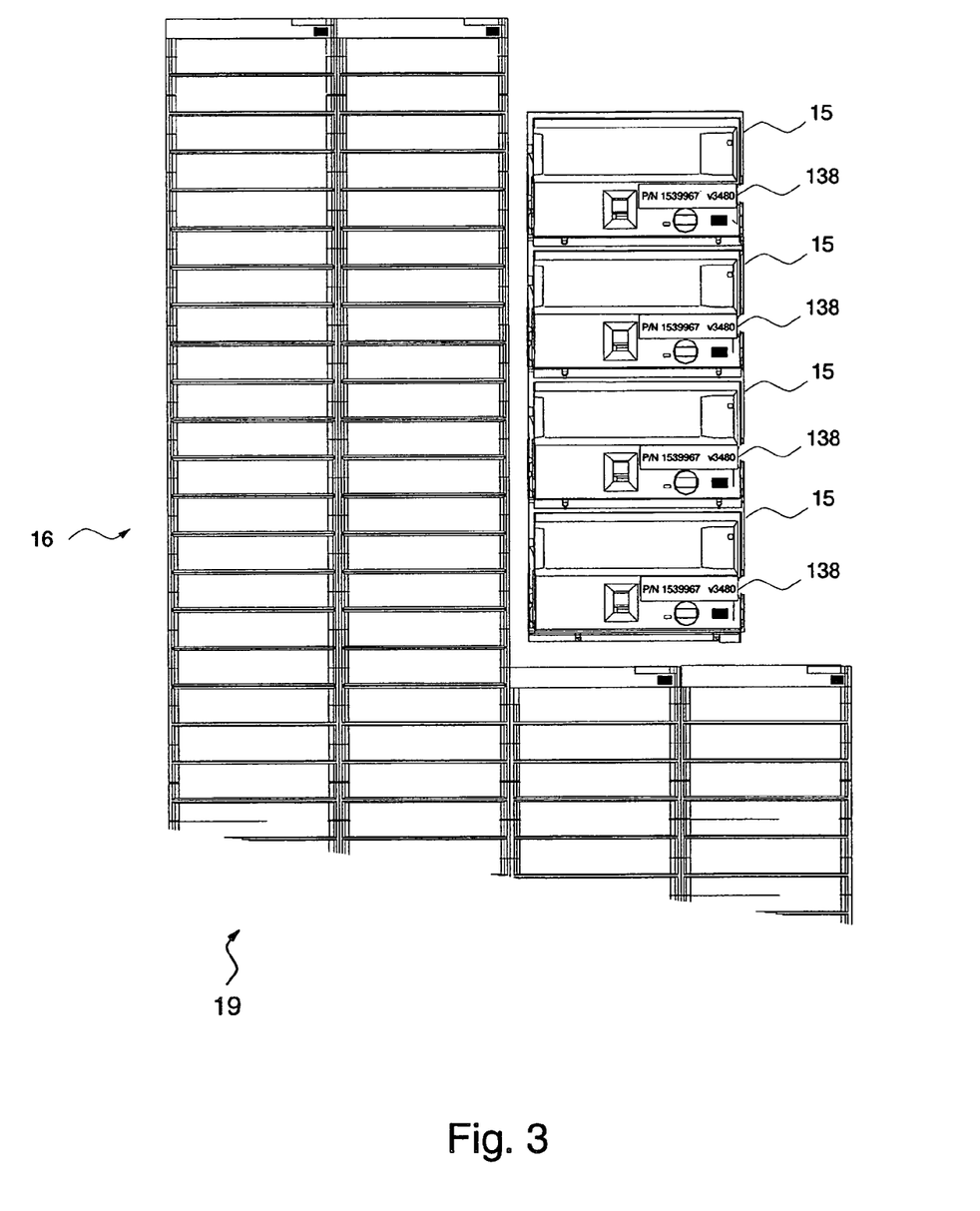
FIG. 3 is a front view of examples of electronic devices of FIG. 1 in an environment of a system.

Referring to FIG. 3, examples of electronic devices of FIG. 1, are illustrated, such as the IBM LTO "Ultrium" magnetic tape drive 15. The tape drives 15 are illustrated in an environment of a system, such as an automated data storage library with storage shelves 16. Each of the tape drives 15 has an electronic persistent visual display 138, which may be of the first type 108 of FIG. 1, or of the second type 112 of FIG. 2.

Figure 4A:
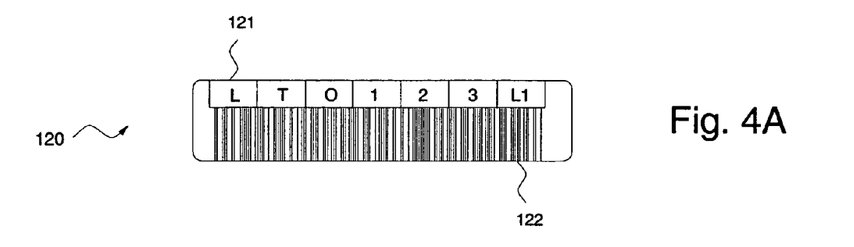
FIGS. 4A, 4B, 4C and 4D are front views of different examples of visual label displays of electronic persistent visual displays employed in accordance with the present invention.
Figure 4B:
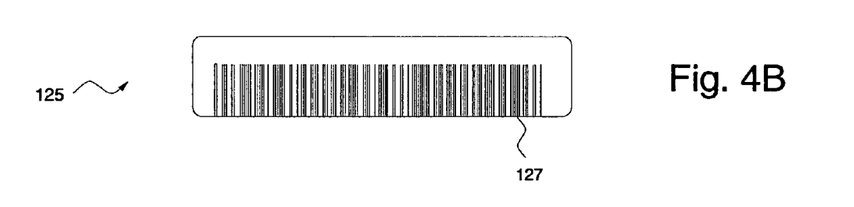
Figure 4C:
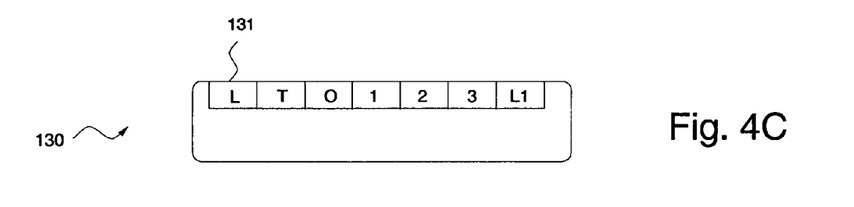
Figure 4D:
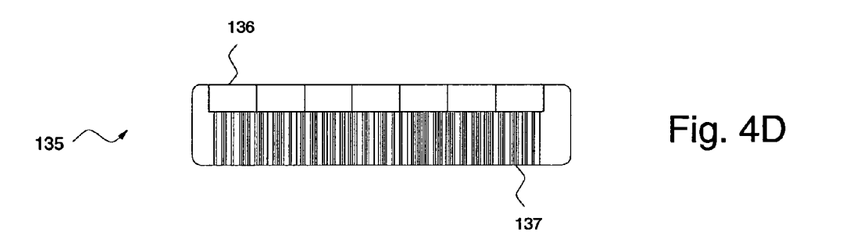

In accordance with the present invention, the electronically updatable external labeling system may provide various types of visual displays, such as illustrated in FIGS. 4A, 4B, 4C and 4D. In FIG. 4A, the visual display 120 comprises a human readable display 121 and a machine readable display 122, for example, readable by a bar code reader. In FIG. 4B, the visual display 125 comprises a machine readable display 127. In FIG. 4C, the visual display 130 comprises a human readable display 131. In FIG. 4D, the visual display 135 comprises a human readable display 136 and a machine readable display 137, and the human readable display has been set to all "blanks", for example, for security. For example, the security display allows machine readability only, e.g. of the machine readable display 137 of FIG. 4D, and prevents human readability of the label. In another variation, the entire label may be made blank so that only machine readable information would be available, and would only be available from the nonvolatile memory 104 of FIG. 1, if any, or from the processor 102. Further, two labels may be provided, and the human readable visual display and/or the machine readable visual display set to a blank. An authorized user may have the processor 102 update the human readable display at the input/output interface or access port 105, or may employ a bar code reader. To restore security, the authorized user may have the processor 102 of FIG. 1 update the human readable display at the input/output interface or access port 105, so that the human readable display 136 is again all blanks.

Referring to FIGS. 3, 5, 6 and 7, the electronic device 100 and electronic persistent visual display 108, 112 of FIGS. 1, and 2 are illustrated as components of a system.

FIGS. 3, 5, 6 and 7 illustrate an embodiment of an automated data storage library which implements embodiments of the present invention. The library is arranged for accessing data storage cartridges (not shown) in response to commands from at least one external host system. The library of FIGS. 3, 5, 6 and 7 comprises a "base frame" 11 having a plurality of storage shelves 16 on front wall 17 and rear wall 19 for storing the data storage cartridges. At least one data storage drive 15 is provided for reading and/or writing data with respect to the data storage cartridges, and at least one robot accessor 18 is provided for transporting the data storage cartridges between the plurality of storage shelves 16 and the data storage drive (s) 15. The library may also comprise an operator panel 23 or other user interface, such as a web-based interface, which allows a user to interact with the library. The robot accessor comprises a gripper assembly 20 for gripping one or more data storage cartridges, and a machine reader 22 for reading labels of the present invention, such as a bar code reader. The machine reader may also comprise a smart card reader/writer, cartridge memory reader/writer, or RFID reader/writer. The library may comprise one or more frames 12 and 13, in addition to the base frame 11, each having storage shelves 16 accessible by the robot accessor 18. Frames 12 comprise extension frames, having storage shelves and possibly data storage drives, and frame 13 comprises a high availability frame, which may additionally comprise a second accessor robot, additional storage shelves, and additional data storage drives, similar to the base frame 11.

Referring to FIG. 3, a portion of rear wall 19 of the library is illustrated, comprising components of the library, such as storage shelves 16 and data storage drives 15. The data storage drives have an electronic persistent visual display 138, which may be of the first type 108 of FIG. 1, or of the second type 112 of FIG. 2. In the illustrated example, the drive visual label displays identify the part number of each particular drive and its version level or number.

Figure 5:
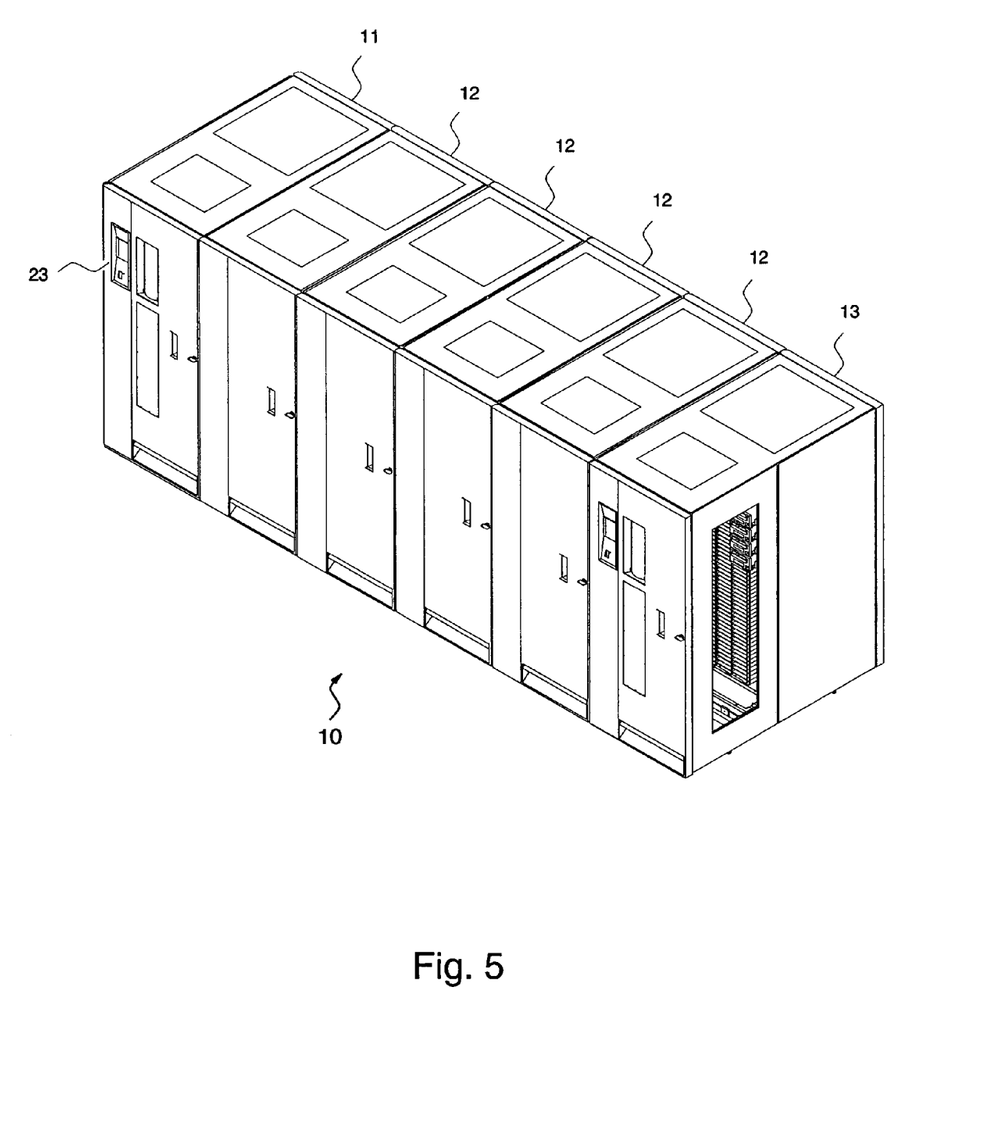
FIG. 5 is an isometric illustration of system comprising an automated data storage library which implements embodiments of the present invention.
Figure 6:
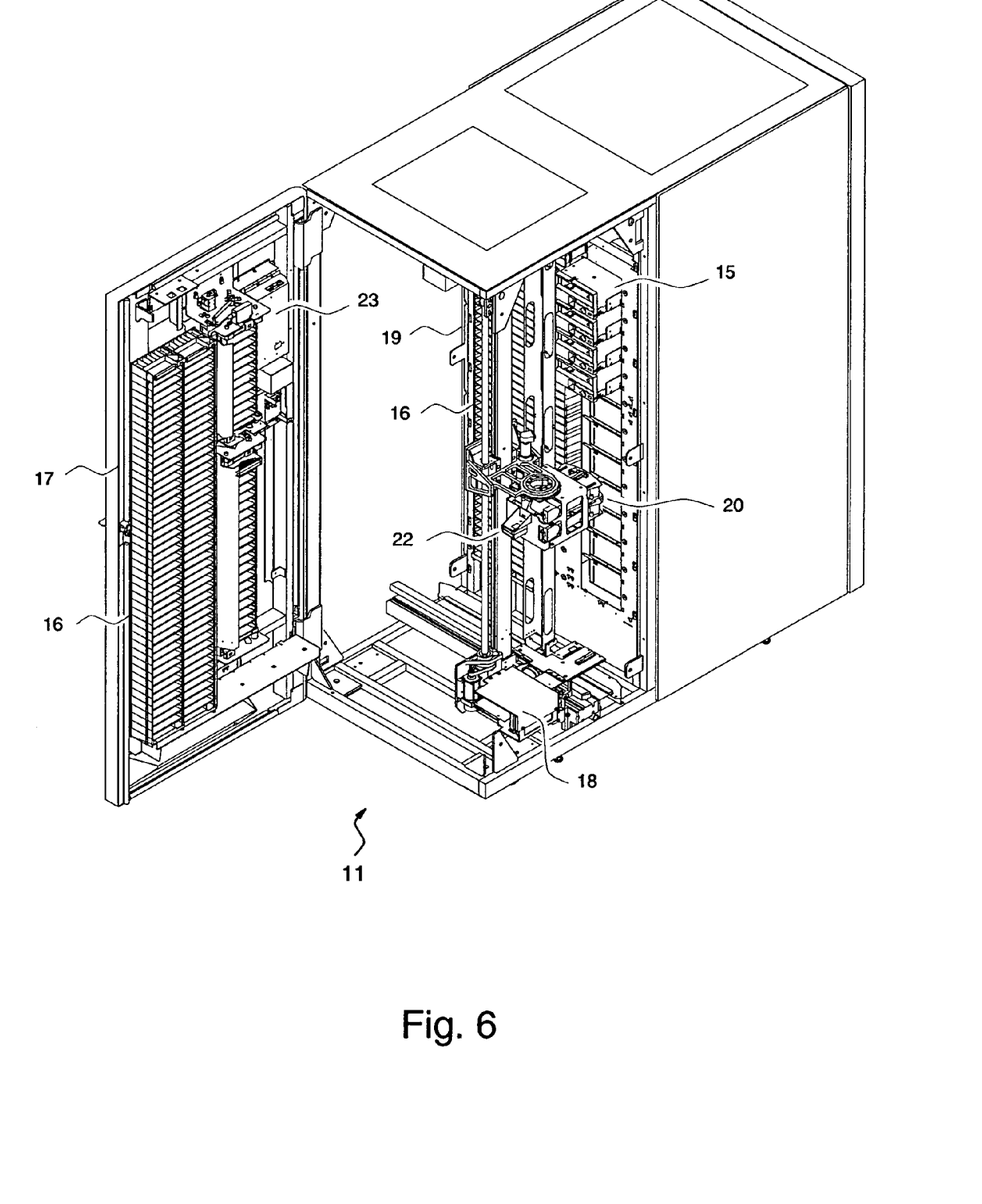
FIG. 6 is an isometric illustration of one portion of the system of FIG. 5, shown with a door open.
Figure 7:
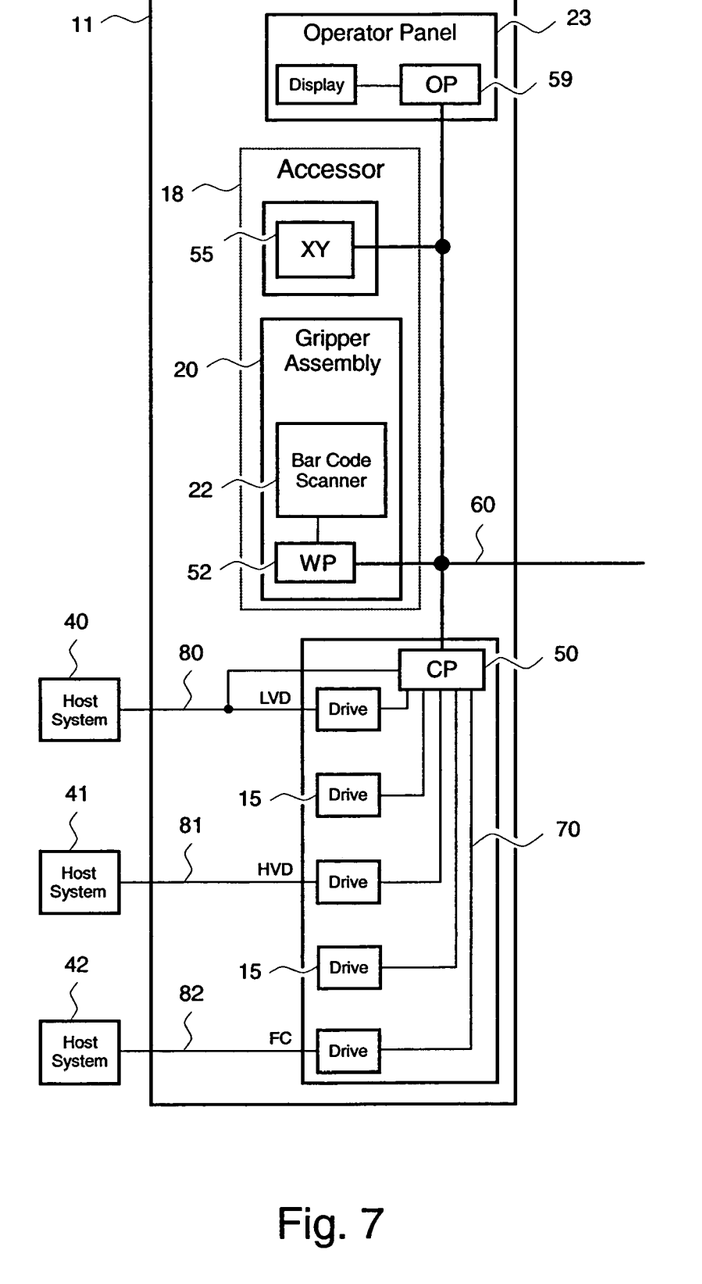
FIG. 7 is a block diagrammatic representation of certain components of the system of FIGS. 5 and 6.

FIG. 7 illustrates certain components of the data storage library of FIGS. 3, 5 and 6, comprising the base frame 11 of the library, which employs a distributed system of modules with a plurality of processor nodes, one or more of which may comprise electronic devices 100 of FIG. 1. An example of such a library comprises the IBM 3584 UltraScalable Tape Library. Alternatively, the library may comprise a single or dual processor system which may, for example, be centralized in the base frame.

The base frame 11 of FIGS. 5, 6 and 7 comprises one or more data storage drives 15, and a robot accessor 18. The robot accessor 18 comprises a gripper assembly 20 and a machine reader 22 for reading cartridge labels, and may be used for reading machine readable displays of the electronic persistent visual displays. Additionally, the machine reader may comprise a smart card reader/writer, cartridge memory reader/writer, RFID reader/writer, etc., which may also be used for communicating with the nonvolatile electronic memory.

In the exemplary system, the robot accessor 18 moves its gripper in at least two directions, called the horizontal "X" direction and vertical "Y" direction, to retrieve and grip, or to deliver and release the data storage cartridge at the storage shelves 16 and to load and unload the data storage cartridges at the data storage drives 15.

The exemplary system receives commands from one or more host systems 40, 41 or 42. The host systems, such as host servers, communicate with the library directly, e.g. on path 80, through one or more control ports, or through one or more of the data storage drives 15 on paths 81, 82, providing commands to access particular data storage cartridges, and move the cartridges, for example, between the storage shelves and the data storage drives. The commands are typically logical commands identifying the cartridge and/or logical locations for accessing the media.

The exemplary system is controlled by a distributed control system receiving the logical commands from hosts, determining the required actions, and converting the actions to physical movements of the robot accessor 18. The distributed control system comprises a plurality of processor nodes, each having one or more processors. In one example, a communication processor node 50 is located in the frame 11, close to the data storage drives 15. Additionally, one or more work processor nodes 52 are provided, in the example, at the robot accessor 18, and is coupled to the communication processor node 50 over a network 60. The communication processor node provides a communication link for receiving the host commands, either directly or through the drives 15. The work processor node responds to received commands from the communication processor node, and directs the operation of the robot accessor, providing move commands. An XY processor node 55 may be located at an XY system of the robot accessor 18. The XY processor node 55 is coupled to the network 60, and is responsive to the move commands, operating the XY system to position the gripper 20, and the machine reader 22.

Electronic devices that are components of the system, such as tape drives 15, processor nodes 50, 52, 55, 59 and their associated operational elements, have semi-static information associated with them, such as part numbers, serial numbers, engineering change levels, computer readable program code or firmware levels, etc., as discussed above. Although this information is commonly stored by the processor of the device or in a nonvolatile memory, and accessed by the processor, so that it can be queried by an operator or by a system of which the electronic device is a component, the information is also provided in the form of visual label displays in accordance with the present invention, so that the needed information is visible since the information is commonly needed when the device is powered off, defective or disassembled.

In one embodiment, the system is provided with a network 60 such that the components interface to the network. The network may comprise one or more point-to-point connections, multi-drop networks, multiple independent networks, etc. Referring additionally to FIG. 1, the input/output interface 105 communicates with the network 60 of FIG. 7. As discussed above, the processor 102 of FIG. 1 stores information regarding the component; and the processor, in response to a predetermined state, provides an update input signal at the input 111 of the electronic persistent visual display 108 of FIG. 1 or input 142 of the electronic persistent visual display 112 of FIG. 2, the update input signal comprising information selected from the information regarding the electronic device stored by the processor, the update signal to update the visual label display 110.

The predetermined state of the processor 102 of the component may comprise a power-on or reset of the component, as a way of refreshing the visual label display 110. Further, the predetermined state of the processor 102 may comprise an expiration of a predetermined interval of time. In one example, the interval of time may comprise 24 hours.

The predetermined state of the processor 102 of the component may comprise a state achieved in response to a signal received at the network interface 105. For example, a user at the terminal 23 of the system of FIGS. 5, 6 and 7 may send a command to update the visual label display. Further, the processor of the component, may additionally select the information stored by the processor in accordance with the signal received at the network interface, in accordance with the received command. For example, if the component is to be maintained or upgraded, and that maintenance or upgrade can be conducted by the network, at the completion of the maintenance or upgrade, the received command may update the information regarding the electronic device stored in the nonvolatile memory 104 and/or stored by the processor 102 of FIG. 1, such that the updated information is available for the visual label display.

In the event the component is powered off defective, disconnected from the network and system, and/or removed for maintenance and/or upgrading, the visual label display 110 of FIGS. 1 and 2 is persistent and will provide information that may be employed in conducting the maintenance and/or upgrading.

The same is true for any electronic device having the electronic persistent visual display 108 of FIG. 1, or 112 of FIG. 2. At the conclusion of the maintenance or upgrading, the one conducting the maintenance or upgrade may provide information to update the information regarding the electronic device stored in the nonvolatile memory 104 and/or stored by the processor 102 of FIG. 1, such that the updated information is available for the visual label display. In this instance, the information may be made available by the input/output interface 105 in the form of an access port. Alternatively, if the input/output interface 105 comprises a connection to a network or other means of communication, the update information may be provided at that point after the electronic device is again connected and powered up. Further, an update itself may comprise the update information.

Figure 8:
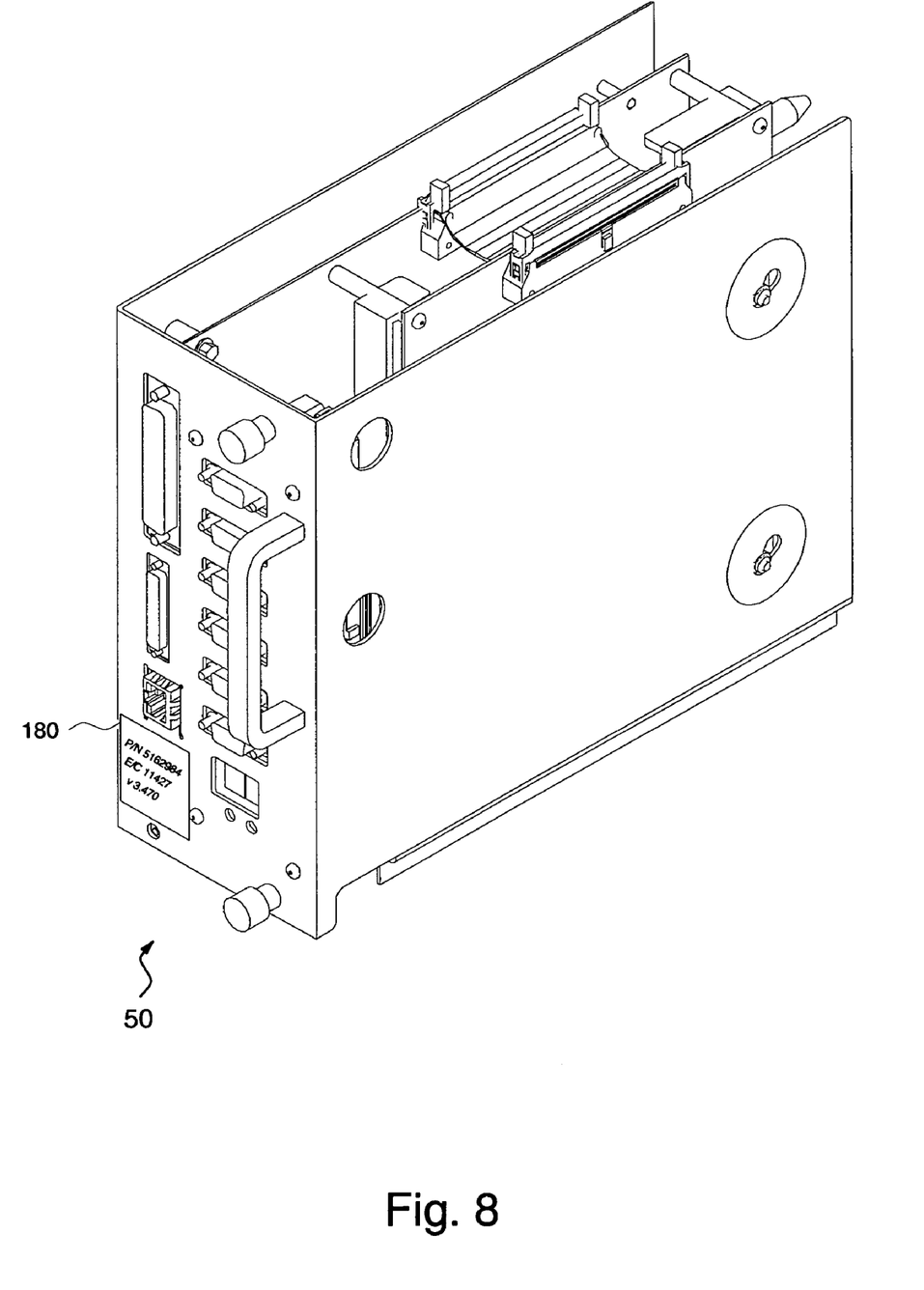
FIG. 8 is an isometric illustration of a communication processor node of the system of FIG. 7, implementing an electronic persistent visual display in accordance with the present invention.
Figure 9:
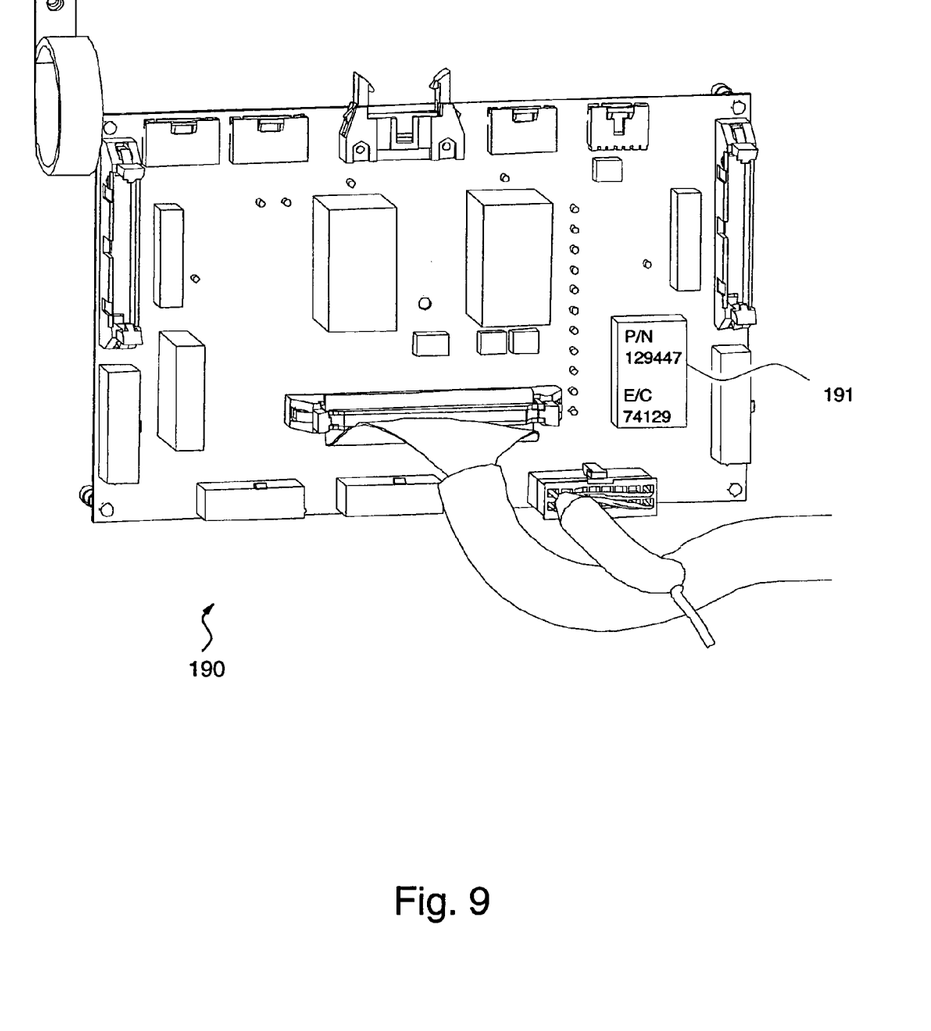
FIG. 9 is an isometric illustration of a circuit board implementing an electronic persistent visual display in accordance with the present invention.

FIG. 8 illustrates a communication processor node 50 of the system of FIG. 7, having an electronic persistent visual display which provides a visual label display 180. FIG. 9 illustrates a circuit board 190 having an electronic persistent visual display 191 which provides a visual label display. The electronic persistent visual display 191 may comprise a pluggable component of the processor board 190, or may form part of a component of the board. The electronic persistent visual displays both of FIG. 8 and of FIG. 9, comprise those discussed with respect to FIGS. 1 and 2.

The illustrated electronic devices of FIGS. 1 and 2, and the illustrated components of the system of FIGS. 3, 5, 6, 7, 8 and 9 may be varied, combined, or combined functions may be separated, as is known to those of skill in the art.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. In an automated data storage library system comprising a plurality of storage shelves and operational elements, said operational elements comprising at least one data storage drive, and at least one robot accessor configured to transport data storage cartridges between said storage shelves and said at least one data storage drive:

a network; and a plurality of independently operating electronic devices, each said electronic device comprising:

(a) a network interface to said network;

(b) an electronic persistent visual display mounted on said electronic device, said electronic persistent visual display having an input, said electronic persistent visual display configured to provide a visual label display which persists indefinitely, until updated by an input signal at said input;

(c) at least one said operational element for operating said automated data storage library, an operational element for at least one said electronic device comprising said at least one data storage drive and said at least one robot accessor; and (d) a processor configured to operate said at least one operational element:

said processor configured to store information regarding at least one of hardware, software and firmware of said at least one operational element and said processor; and said processor configured to, in response to a predetermined state, provide an update input signal at said electronic persistent visual display input for display by said electronic persistent visual display, said update input signal comprising selected said information regarding at least one of hardware, software and firmware of said at least one operational element and said processor stored by said processor, said update signal to update said visual label display of said electronic persistent visual display.

2. The system of claim 1, wherein said predetermined state of said processor of said at least one electronic device comprises a power-on and/or reset of said electronic device.

3. The system of claim 1, wherein said processor of each of said plurality of electronic devices comprises a programmable computer processor and said predetermined state of said processor comprises completion of an update to computer readable program code of said programmable computer processor.

4. The system of claim 3, wherein said processor of each of said plurality of electronic devices additionally is configured to update said information regarding said at least one operational element and said processor stored by said processor with status information related to said update to computer readable program code of said programmable computer processor, and said processor update signal selected information comprises at least said status information.

5. The system of claim 4, wherein said processor of each of said plurality of electronic devices comprises programmable logic and said predetermined state of said processor comprises completion of an update to said programmable logic.

6. The system of claim 5, wherein said processor of each of said plurality of electronic devices additionally is configured to update said information regarding said at least one operational element and said processor stored by said processor with a version number of said update to said programmable logic, and said processor update signal selected information comprises at least said version number of said update to said programmable logic.

7. The system of claim 1, wherein said predetermined state of said processor comprises a state achieved in response to an indication of completion of an engineering change to said electronic device.

8. The system of claim 7, wherein said processor of each of said plurality of electronic devices additionally is configured to update said information regarding said at least one operational element and said processor stored by said processor with an engineering change number of said engineering change to said electronic device, and said processor update signal selected information comprises at least said engineering change number of said engineering change.

9. The system of claim 1, wherein said processor of each of said plurality of electronic devices additionally is configured to update said information regarding said at least one operational element and said processor stored by said processor with status information related to said change to said at least one operational element, and said processor update signal selected information comprises at least said status information.

10. The system of claim 1, wherein said predetermined state of said processor comprises a state achieved in response to a signal received at said network interface.

11. The system of claim 10, wherein said processor of each of said plurality of electronic devices additionally is configured to select said information stored by said processor in accordance with said signal received at said network interface.

* * * * *